(12) United States Patent
Ishii et al.

(10) Patent No.: US 6,720,944 B1
(45) Date of Patent: Apr. 13, 2004

(54) ELECTRO-OPTICAL DEVICE, METHOD OF MANUFACTURING SAME, PROJECTOR AND ELECTRONIC APPARATUS

(75) Inventors: Ryo Ishii, Matsumoto (JP); Kinya Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/509,198

(22) PCT Filed: Jul. 26, 1999

(86) PCT No.: PCT/JP99/04003

§ 371 (c)(1),
(2), (4) Date: Jun. 5, 2000

(87) PCT Pub. No.: WO00/07170

PCT Pub. Date: Feb. 10, 2000

(30) Foreign Application Priority Data

Jul. 27, 1998 (JP) .......................................... 10-211293

(51) Int. Cl.[7] ................................................. G09G 3/36
(52) U.S. Cl. .......................... 345/87; 349/153; 349/155
(58) Field of Search ............................. 345/87, 38, 50; 349/153, 155, 151, 156

(56) References Cited

U.S. PATENT DOCUMENTS

| | | | | |
|---|---|---|---|---|
| 5,148,301 A | * | 9/1992 | Sawatsubashi et al. | 349/153 |
| 5,335,103 A | * | 8/1994 | Kim | 349/154 |
| 5,973,763 A | * | 10/1999 | Fujimura et al. | 349/156 |
| 5,995,189 A | * | 11/1999 | Zhang | 349/153 |
| 6,104,457 A | * | 8/2000 | Izumi et al. | 349/73 |
| 6,124,917 A | * | 9/2000 | Fujioka et al. | 349/153 |
| 6,136,444 A | * | 10/2000 | Kon et al. | 428/423.1 |
| 6,163,357 A | * | 12/2000 | Nakamura | 349/155 |
| 6,219,127 B1 | * | 4/2001 | Hirakata et al. | 349/153 |

FOREIGN PATENT DOCUMENTS

| | | |
|---|---|---|
| JP | 50-148097 | 11/1975 |
| JP | 3-26121 | 3/1991 |
| JP | 5-198375 | 8/1993 |

* cited by examiner

Primary Examiner—Steven Saras
Assistant Examiner—Fritz Alphonse
(74) Attorney, Agent, or Firm—Oliff & Berridge, PLC

(57) ABSTRACT

The invention concerns preventing the occurrence of breakage or short-circuiting caused by spacer members among wires made of conductive layers laminated on one substrate that holds an electro-optical material in an electro-optical apparatus. The electro-optical apparatus may include an electro-optical material provided in a region surrounded by a sealing unit between a pair of substrates, along with a conductive layer laminated on one of the pair of substrates. The sealing unit may be divided into a part having a spacer member and a part not having the spacer member, and the wiring made of the conductive layer, is provided between the part not having the spacer member of the sealing unit and the substrate.

28 Claims, 10 Drawing Sheets

(a)　　　　　　　　　(b)

ELECTRO-OPTICAL DEVICE, METHOD OF MANUFACTURING SAME, PROJECTOR AND ELECTRONIC APPARATUS

BACKGROUND OF THE INVENTION

1. Field of the Invention

The present invention relates to the technical fields of electro-optical apparatuses utilized in display units for television sets, video cameras, and portable remote terminals, or light modulators for projection display devices or the like. In particular, the present invention relates to the technical field of an electro-optical apparatus which has a construction in which one or a plurality of conductive layers for wiring are laminated between a sealing unit for surrounding an electro-optical material, such as a liquid crystal, and a substrate.

2. Description of Related Art

A typical electro-optical apparatus has a construction in which an electro-optical material, such as a liquid crystal, is held in a region surrounded by a sealing unit between substrates. In order to maintain a gap between the substrates at a predetermined interval, spherical or fibrous particles including beads, glass fibers and the like, so-called "spacers", are mixed in the sealing unit. Pixel electrodes are provided at the inner surface of one substrate of a pair of substrates for driving the electro-optical material, and are connected to a terminal provided in an external region of the sealing unit (i.e., outside the sealed region) via wirings. That is, in the above electro-optical apparatus, a conductive layer includes a single wiring layer between the sealing unit and the substrate.

Additionally, in an electro-optical apparatus having semiconductor switching elements devices on a substrate, since deterioration of image quality occurs due to leakage current caused by the light, a light-shielding layer including metal must be provided between the substrate and the sealing unit to block the incident light from propagating into a semiconductor layer. Hence, wiring formed on the substrate, an insulation layer, and the light-shielding layer are laminated in that order, resulting in the conductive layer including two layers: the wiring layer and the light-shielding layer between the sealing unit and the substrate.

Furthermore, in an electro-optical apparatus in which each pixel has a semiconductor switching element and a driving circuit for driving the semiconductor switching element is provided in an internal region of the sealing unit (i.e., inside the sealed region) as well as for being controlled by a control circuit, one or two layers for wiring and one layer for light-shielding, i.e. three conductive layers in total, may be laminated through insulation layers between the sealing unit and the substrate.

In addition, when the driving circuits are provided outside the sealed region in an electro-optical apparatus, there are cases in which various types of wiring (e.g., scanning lines, data lines, capacitance lines, and the like) are formed between the sealing unit and the substrate by utilizing one or more conductive layers.

As described above, there are electro-optical apparatuses having various constructions in accordance with the driving method, and the location of the driving circuit, and furthermore, in accordance with the number of conductive layers utilized for wiring, light-shielding, electrodes, or the like. In any case, a plurality of lines must be formed from outside the sealed region to the inside of the sealed region, through the conductive wirings between the sealing unit and the substrate.

However, particularly in an electro-optical apparatus having a multiple conductive layers between the sealing unit and the substrate, when both substrates are bonded with the sealing unit, and both substrates are compressed, some portions of the conductive layers are subjected to strong pressure from spacer members contained in the sealing unit. Hence, there are problems such as deformations in the wiring and the light-shielding layer, short-circuits between the wiring and the light-shielding layer due to breakage, short-circuits among the wiring laminated one on top the other through an insulation layer, furthermore resulting in breaking of wirings.

Also, the foregoing problems may be fully anticipated not only specifically in the electro-optical apparatus having the semiconductor switching elements on the substrate, but also in an inner-reflective-type electro-optical apparatus having a construction in which an insulating layer and pixel electrodes are disposed on a reflective layer, composed of Al (aluminum) and the like, disposed on the inner surface of a glass substrate of a pair of glass substrates.

Furthermore, even when various types of wiring from the outside of the sealed region to the inside of the sealed region are formed on only the single conductive layer, and the substrates are compressed, since the conductive layer is subjected to localized pressure from the spacer members, there is the possibility that the wiring will break at that part. In short, in an electro-optical apparatus adopting any of the constructions which form various types of wiring from the outside of the sealed region to the inside of the sealed region utilizing the single layer or multiple layers between the sealing unit and the substrates, breaking of wirings and short-circuit problems caused by such spacer members occur.

SUMMARY OF THE INVENTION

The present invention is made in view of the foregoing problems. It is an object thereof to provide an electro-optical apparatus, a method for manufacturing the same, and a projection display device and an electric apparatus having this electro-optical apparatus so as to be able to prevent the wiring formed on one of the substrates holding an electro-optical material from damage by spacer members.

To solve the foregoing problems, the present invention is characterized in that an electro-optical apparatus has an electro-optical material provided in a region surrounded by a sealing unit between a pair of substrates, and a conductive layer laminated on one of the pair of substrates, the sealing unit comprises a part having a spacer member and a part not having the spacer member, and a part of the sealing unit not having the spacer member is provided in a region in which wiring, made of the conductive layer on one of the substrates, faces the sealing unit.

According to the electro-optical apparatus of the present invention, a sealing unit made of a sealant such as a photo-curable or thermosetting resin adhesives is divided into a part having spacer members of a predetermined size, for example, in the shape of beads, or fibers, and a part not having the spacer members. The wiring, made of the conductive layer, is laminated in the region which faces the part not containing spacer members on the substrate. That is, since there is no spacer member in the part of the sealing unit in which the wiring, made of the conductive layer, intersect one another, even though the substrates are compressed, the wirings are not subjected to localized pressure from spacer members. Accordingly, it is possible to prevent breakage due to spacer members. At the same time, since the gap between the substrates is highly accurately controlled by the spacer members contained in the sealing unit, it is very useful in the case of a portable electro-optical apparatus or the like where a mixture of spacer members in an electro-optical material produces deterioration of image quality.

According to one aspect of an electro-optical apparatus of the present invention, the conductive layer includes multiple conductive layers laminated on the substrate through an insulation layer.

According to this aspect, when multiple wiring are formed by using multiple conductive layers insulated to each other by insulation layers, not only the foregoing breakage caused by spacer members can be prevented but also the short circuit of the wiring laminated due to localized pressure caused by spacer members can be prevented.

In addition, using a three-dimensional structure of, for example, a pixel electrode, such as a reflective electrode, lines, such as scanning lines or data lines, a light-shielding layer for an element, such as a TFT (Thin Film Transistor), for switching a pixel electrode on and off or the like, effective utilization for the disposition can be realized in limited space of the substrate by multiple conductive layers. It is advantageous that by adopting a three-dimensional wiring structure, the required widths of the area which the wiring occupy can be reduced, particularly in places where the wiring and the sealing unit intersect.

In another aspect of an electro-optical apparatus of the present invention, a part of the sealing unit not having the spacer members is a shielding unit for shielding an opening through which the electro-optical material is injected.

According to this aspect, since the part not having spacer members mixed therein is the shielding unit for shielding the opening for injecting the electro-optical material, by devising a pattern of wiring, the electro-optical apparatus can be obtained with a single type of sealing material, in accordance with a conventional manufacturing method. Specifically, when the construction is adopted in which the electro-optical material is a liquid crystal and the shielding unit shields the opening for injecting the liquid crystal, since the width of the opening for injecting the liquid crystal is appropriate for various types of wiring required for driving liquid crystal to pass through, it is convenient in practice.

In addition, one of the substrates may be constructed so as to include a plurality of scanning lines and a plurality of data lines, along with a switching element at a pixel location corresponding to each intersection point of these lines, as well as pixel electrodes connected thereto, and the multiple conductive layers include a first conductive layer constituting the wiring for a scanning line driving circuit supplying the scanning lines with scanning signals, and a second conductive layer constituting the wiring for a data line driving circuit supplying the data lines with data signals.

With this construction, since there is no spacer member in a part in which the wiring, made of the first conductive layer, led to the scanning line driving circuit and the wiring, made of the second conductive layer, led to the data line driving circuit are laminated, breakage or short-circuiting in these lines can be prevented. Specifically, when at least one of the data line driving circuit and the scanning line driving circuit are formed inside the sealed region, since there are many cases in which both the first conductive layer and the second conductive layer have laminated layer structures, the structures according to the present invention are useful.

In another aspect of an electro-optical apparatus of the present invention, a part of or the entirety of the conductive layer is a light-shielding layer.

According to this aspect, the conductive layer can be used not only for wiring, but also for wiring and light-shielding, or chiefly for light-shielding for a part (that is, at least a part of a conductive layer among one or more conductive layers). Here, the light-shielding layer is specifically a metal layer made of Al or the like. The conductive layer can function like various types of light-shielding layers, such as a light-shielding layer provided, viewed horizontally, within the sealed region inside the sealant and defining the frames of an image display region for displaying an actual image, as a light-shielding layer (black mask of the color filters, black matrix or the like) light-shielding the gap between numerous pixel electrodes arranged in the image display region or defining an opening region for each pixel, or as a light-shielding layer for preventing deterioration of image quality due to leakage current caused by light in a semiconductor element such as TFT provided for switching-controlling the pixel electrodes. Thus, since the light-shielding layer and the wiring can be formed from the same conductive layer, simplification of the construction of the apparatus and the manufacturing thereof can be achieved.

According to another aspect of an electro-optical apparatus of the present invention, a planarized insulation layer is further provided on the wiring.

According to this aspect, since the apparatus is not of the direct-view type, for example, in the same way as for a reflective light valve for a liquid crystal projector, in a case of a liquid crystal apparatuses in which emphasis is not on increase in the scattering factor of the light but on increase in the reflection factor thereof, it is advantageous that the reflection factor is achieved to be improved by a planarization process. Furthermore, in a region of the substrate facing the sealing unit, normally, uniformity of the height between the substrates along the sealing unit is achieved by the insertion of dummy wiring, and the gap control between the substrates is performed by the spacer members. When the planarization process is performed by CMP (Chemical Machine Polish) processing after the dummy wiring is thus inserted, CMP processing is performed in a preferable manner, and an improvement in flatness is achieved.

In another aspect of an electro-optical apparatus of the present invention, a plurality of pixel electrodes arranged in an internal region of the sealed unit, and a driving circuit connected to the wiring and driving the pixel electrodes are further provided.

According to this aspect, compared to a case in which such a driving circuit is provided in an external region of the sealing unit (outside the sealed region), the total number of wiring intersecting the sealing unit can be reduced. For example, the total number of wiring intersecting the sealing unit is generally far less than the total number of scanning lines and the data lines which lead from the driving circuits to each pixel.

In the aspect of the invention having these driving circuits, this may be constructed so that a plurality of scanning lines and a plurality of data lines, which are connected to the pixel electrodes, are further provided in the internal region of the sealed region, the driving circuit includes a scanning line driving circuit and a data line driving circuit for driving the scanning lines and the data lines, respectively, and the data line driving circuit is provided nearer a part where the wiring intersects the sealing unit than where the scanning line driving circuit is provided.

With such a construction, by wiring provided on a region of the substrate facing a part of the sealing unit not containing spacer members, a signal can be supplied from a control circuit or a signal source to both the scanning line driving circuit and the data line driving circuit provided outside the sealed region. Specifically, in this case, capacitance and delay become greater in accordance with the length of the wiring, made of a conductive layer, such as Al, leading on the substrate. However, by relatively extending the length of the wiring for the scanning line driving circuit driven at a low frequency while relatively shortening the length of the wiring for the data line driving circuit driven at a high frequency, adverse effects caused by such wiring capacitance and delay are barely or not substantially produced, which is advantageous.

Alternatively, in the aspect having this driving circuit, it may be constructed so as to further provide a control circuit in the internal region of the sealed region for controlling the driving circuits.

With such a construction, by wiring provided on a region of the substrate facing a part of the sealing unit not containing spacer members, a signal can be supplied from the signal source outside the sealed region to the control circuit. Specifically, in this case, because the number of wiring from the signal source to the control circuit can be constructed so as to be less than the number of wiring from the control circuit to the driving circuits, it is possible for wiring to be performed even in a small part of the sealing unit not containing spacer members.

A manufacturing method for an electro-optical apparatus of the present invention is characterized in that one substrate having a conductive layer laminated thereon, and the other substrate, are bonded with a sealing unit comprising a part having a spacer member and a part not having a spacer member, the method for manufacturing the electro-optical apparatus comprising a sealing unit forming process of forming a sealing unit provided so that a part of the sealing unit not having the spacer member is provided in a region on the substrate in which the wiring, made of the conductive layer, faces the sealing unit.

According to the method for manufacturing the electro-optical apparatus of the present invention, the sealing unit is divided into a part containing the spacer members and a part not containing spacer members. The sealing unit is formed so that the part of the sealing unit not containing spacer members is provided on the region of the substrate where the wiring, made of the conductive layer, faces the sealing unit. That is, because there is no spacer member in which lines, made of the conductive layer, intersect the sealing unit, when a pair of substrates is bonded by the sealing unit, even though they are compressed, the wiring are not subjected to localized pressure from spacer members. Accordingly, breakage caused by spacer members can be prevented.

In one aspect of a method for manufacturing the electro-optical apparatus of the present invention, the sealing unit forming process includes a process of coating the sealant so that an opening for injection of the electro-optical material is provided in the region in which wiring, made of the conductive layer, faces the sealing unit.

This aspect causes the formed position of the opening part (opening for injecting the electro-optical material) to correspond to that of wiring facing the sealing unit, and solely by devising a pattern of wiring, the electro-optical apparatus of the present invention can be obtained by using a single type of material as the sealing material. Naturally, the opening unit is shielded with the sealant after injection of the electro-optical material.

In one aspect of a method for manufacturing an electro-optical apparatus of the present invention, wiring forming process of forming the wiring from multiple conductive layers is laminated on the substrate through insulation layers before the sealing part forming process.

According to this aspect, after a plurality of wiring are formed using multiple conductive layers by the wiring forming process, when a pair of substrates are bonded by the sealing unit, even though they are compressed, not only the foregoing breakage caused by spacer member can be prevented but also the short circuit of the wiring laminated due to localized pressure caused by spacer members can be prevented.

In order to solve the foregoing problems, an electronic apparatus of the present invention is characterized in that the electronic apparatus includes as a display unit an electro-optical apparatus of the above-described present invention.

According to the electronic apparatus of the present invention, because it is provided with the electro-optical apparatus of the above-described present invention, even though the substrates are compressed, lines are not subjected to localized pressure from spacer members, and so defects of wiring caused by spacer members can be prevented, and improvement in the image display quality, improvement in the apparatus reliability and improvement in the manufacturing yield rate can be achieved.

In one aspect of an electronic apparatus of the present invention, the conductive layer includes multiple conductive layers laminated through insulation layers on the substrate.

According to this aspect, not only the foregoing breakage caused by spacer member can be prevented but also the short circuit of the wiring laminated due to localized pressure caused by spacer members can be prevented.

To solve the foregoing problems, a projection display device of the present invention is characterized in that the projection display device modulates light emitted from a light source by an electro-optical apparatus of the present invention and projects the modulated light onto a screen.

According to the projection display device of the present invention, since light-modulation can be performed by the described above electro-optical apparatus of the present invention, even though the substrates are compressed, the wiring are not subjected to localized pressure from spacer members, and so defects of wiring caused by spacer members can be prevented, and improvement in the apparatus reliability and improvement in the manufacturing yield rate can be achieved.

In one aspect of a projection display device of the present invention, the conductive layer includes multiple conductive layers laminated through insulation layers on the substrate.

According to this aspect, not only the foregoing breakage caused by spacer can be prevented but also the short circuit of the wiring laminated due to localized pressure cuased by spacer members can be prevented.

These operations and other advantages of the present invention will be apparent from the following description of the embodiments.

DESCRIPTION OF THE PREFERRED EMBODIMENTS

Hereinbelow, embodiments of the present invention are described with reference to the drawings.

1. First Embodiment

Figure 1:
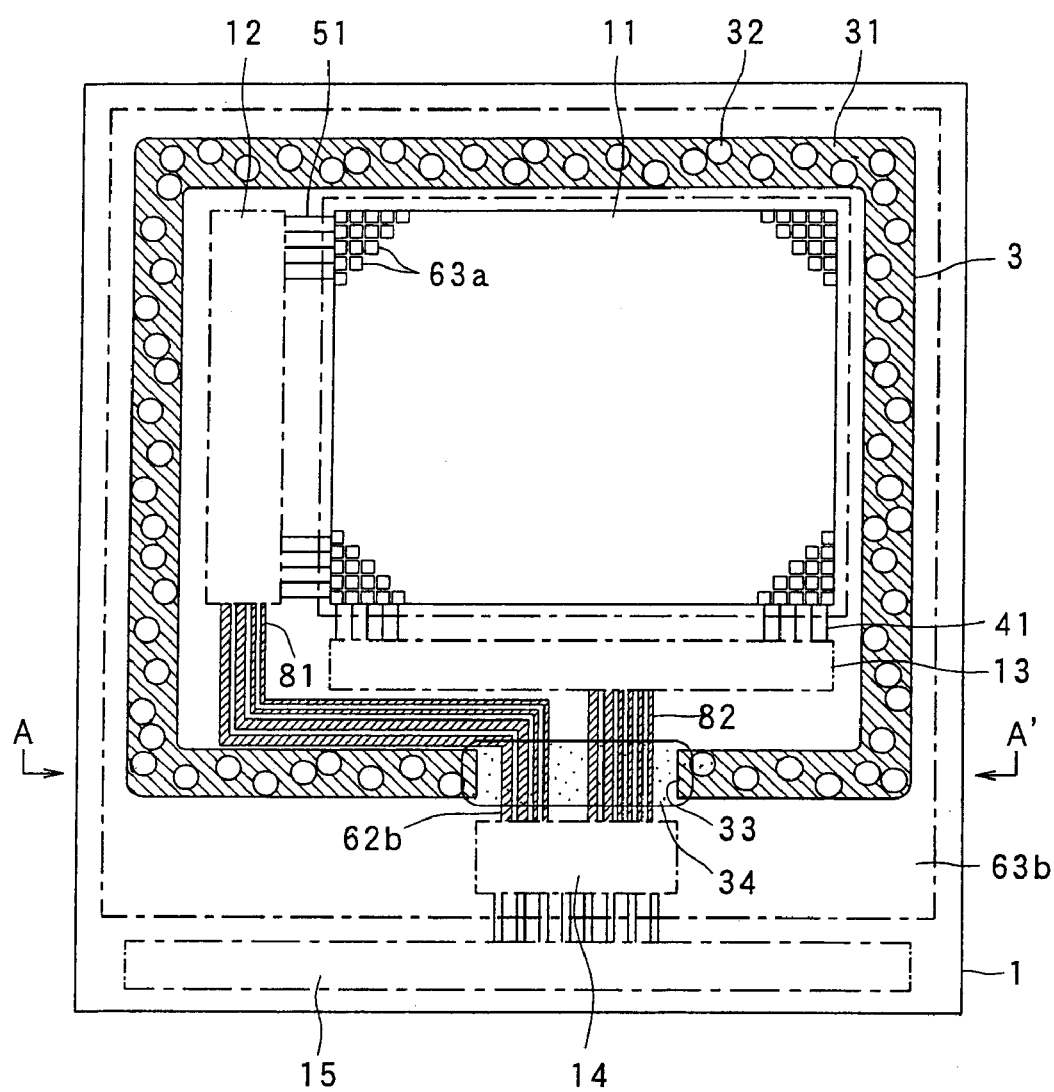
FIG. 1 is a plan view illustrating a construction of the electro-optical apparatus according to a first embodiment of the present invention.
Figure 2:
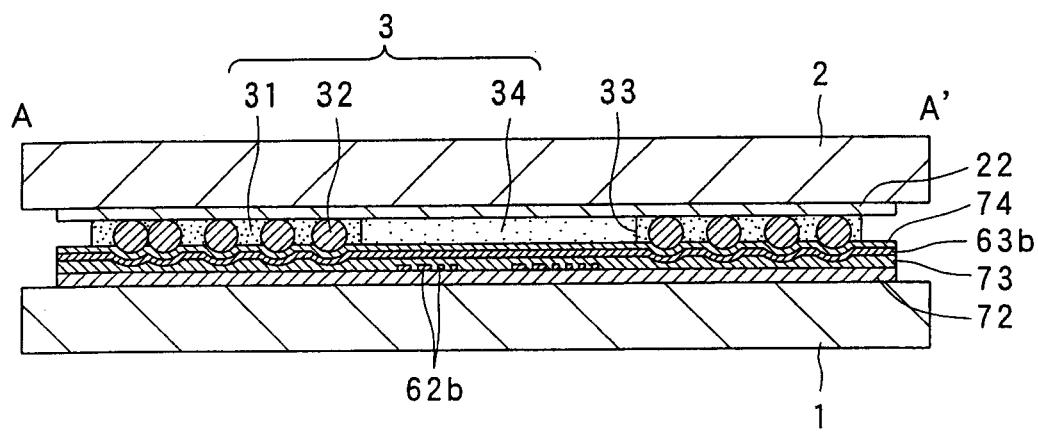
FIG. 2 is a cross-sectional view taken along line II—II of FIG. 1.
Figure 3:
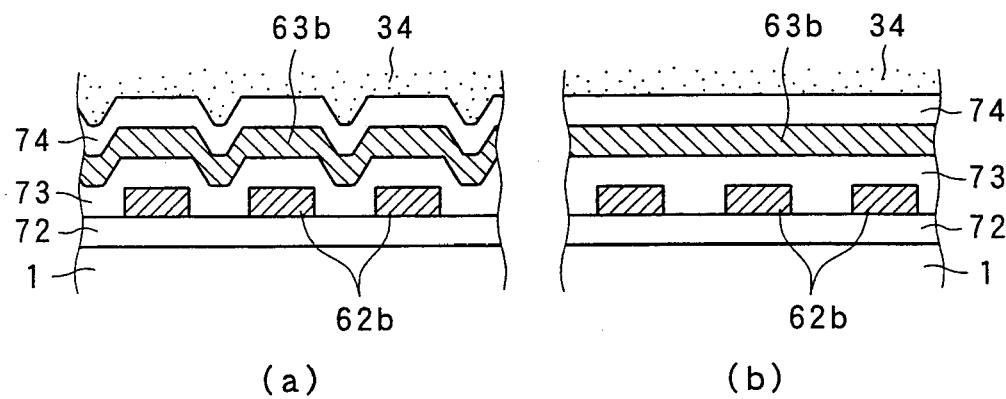
FIGS. 3(*a*) and 3(*b*) are enlarged cross-sectional views of the wiring passing through a sealing unit of the first embodiment.
Figure 4:
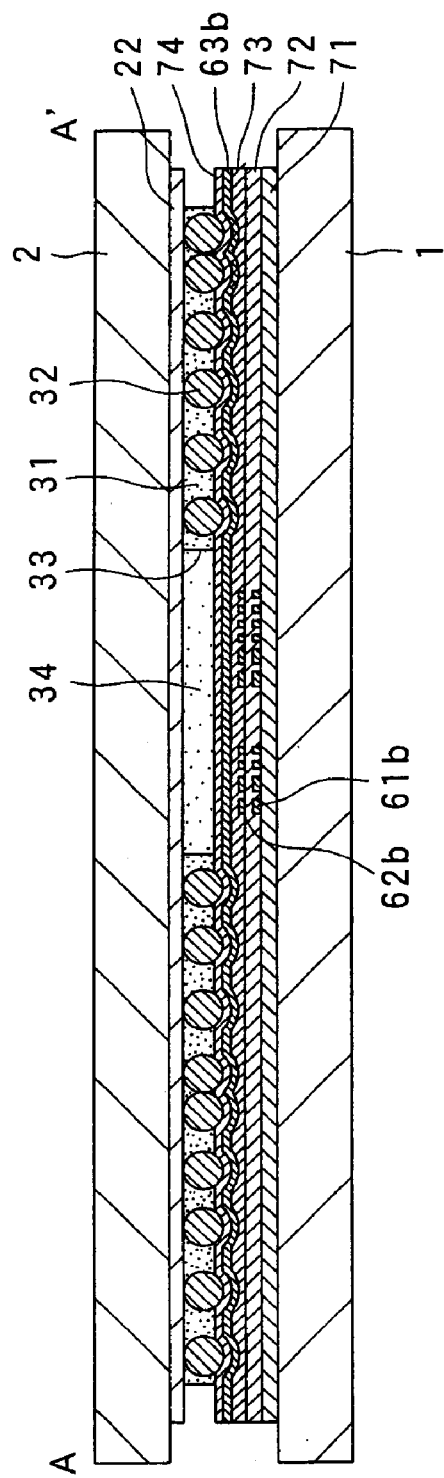
FIG. 4 is a cross-sectional view taken along line II—II in a variation of the first embodiment.
Figure 5:
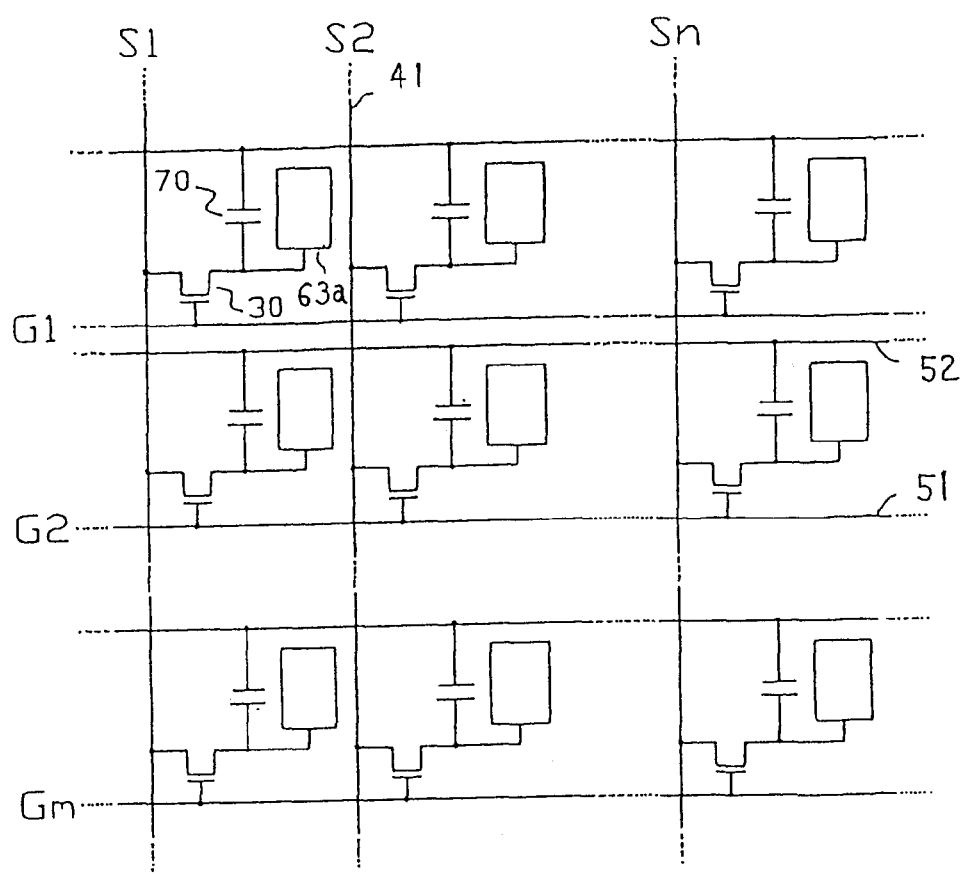
FIG. 5 illustrates an equivalent circuit for various types of devices, wiring, and the like in a plurality of pixels formed in a matrix, constituting an image display region of the first embodiment.
Figure 6:
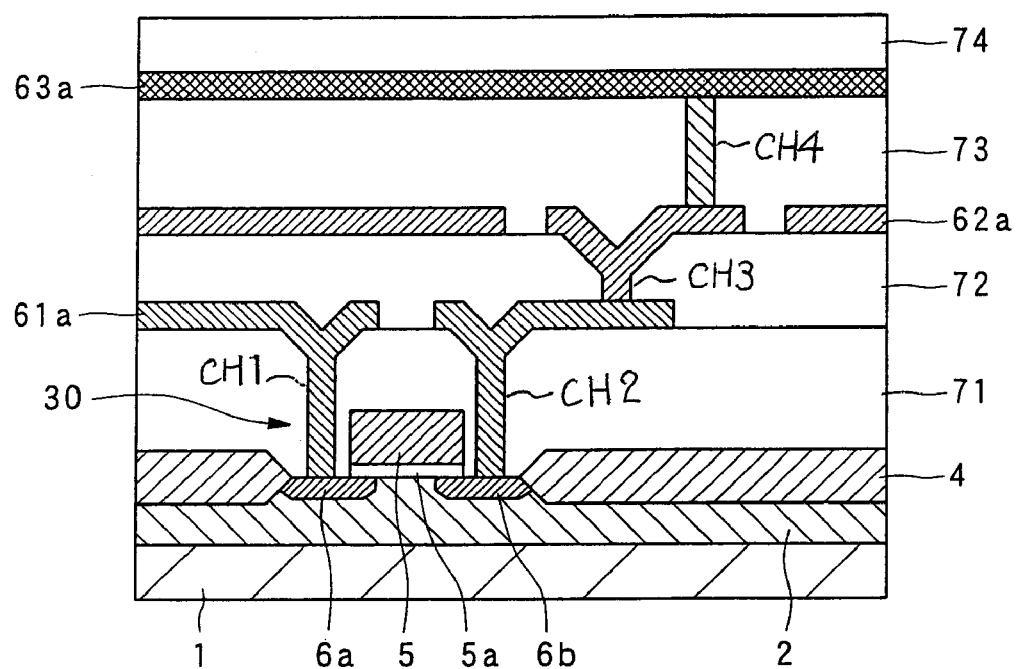
FIG. 6 is a cross-sectional view illustrating a laminating structure under a pixel electrode formed on a device substrate of the first embodiment.

First, an electro-optical apparatus according to a first embodiment of the present invention is explained with reference to FIGS. 1 to 6. FIG. 1 is a plan view illustrating a construction of this electro-optical apparatus. FIG. 2 is a cross-sectional view taken along line II—II in the electro-optical apparatus of FIG. 1, FIGS. 3(a) and 3(b) are enlarged cross-sectional views in wiring section thereof, and FIG. 4 is a cross-sectional view taken along line II—II in a variation thereof. FIG. 5 illustrates an equivalent circuit for various types of devices, wiring, and the like in a plurality of pixels, constituting an image display region of this electro-optical apparatus, which is formed as a matrix. FIG. 6 is a cross-sectional view illustrating a laminating structure under a pixel electrode formed on a device substrate for each pixel.

As shown in FIGS. 1 and 2, a plurality of scanning lines 51 and data lines 41 are formed respectively on the silicon substrate 1, on which the semiconductor switching elements are formed, of the two substrate constituting the electro-optical apparatus, while a switching element described below (see FIGS. 5 and 6), at a pixel location corresponding to each intersection of these lines, and a pixel electrode 63a connected thereto, are formed. These scanning lines 51, data lines 41, switching elements, and pixel electrodes 63a constitute the image display region 11.

Among these, the scanning lines 51 are connected to a scanning line driving circuit 12 formed inside the sealed region corresponding to an internal region of a sealing unit 3 on the substrate 1 while the scanning line driving circuit 12 is connected to a control circuit 14 formed outside the sealed region corresponding to an external region of the sealing unit 3 through the wiring 81. On the other hand, the data lines 41 are connected to a data line driving circuit 13 formed inside the sealed region while the data line driving circuit 13 is connected to the control circuit 14 through the wiring 82. Here, the control circuit 14 drives both the scanning line driving circuit 12 and the data line driving circuit 13, respectively, based on a signal supplied from an electrode terminal 15 for external connection. In addition, the switching element for performing switching-control on each pixel electrode 63a, the scanning line driving circuit 12, the data line driving circuit 13 and the control circuit 14 are composed of, for example, bulk-silicon-type MOS transistors.

The sealing unit 3 includes a sealant 31, made of photo-curable or thermosetting resin adhesives, or the like, for surrounding an electro-optical material such as a liquid crystal, with both substrates, spacer members 32 which are particles of predetermined size in the shape of beads, fibers, or the like mixed into the sealant 31, and a shielding member 34 which does not contain spacer members 32 mixed therein and which is made of photo-curable or thermosetting resin adhesives, or the like which is the same as or different from that of the sealant 31, thereby sealing an opening part 33 (opening for injecting) after the liquid crystal is injected.

As shown in FIG. 2, each of two conductive layers 62b and 63b, composed of a conductive and reflective metal layer such as Al, is disposed on the substrate 1 between the shielding member 34 of the sealing unit 3 and the substrate 1. These conductive layers 62b and 63b are laminated through insulation layers 72, 73 and 74. As shown in FIG. 1, the lower conductive layer 62b constitutes wiring 81 and 82, whereas the upper conductive layer 63b constitutes a light-shielding layer defining the frames of the image display region 11 along the sealing unit 3. Furthermore, the wiring for the MOS transistors, the internal wiring of the scanning line driving circuit 12, the internal wiring of the data line driving circuit 13, and the internal wiring of the control circuit 14, the wiring for interconnecting them, the power wiring for supplying power to these driving circuits, and the like are formed on the same layer as the conductive layer 62b. Also, the described above pixel electrodes 63a are formed from the same layer as the conductive layer 63b.

Here, according to the present embodiment, in the manufacturing process for the electro-optical apparatus having the cross-sectional structure as shown in FIG. 2, when both substrates are bonded with the sealant 31 coated on the circumference thereof along with the compression of both substrates, subsequently, electro-optical materials composed of a liquid crystal and the like are injected from the opening 33, and then the opening 33 is shielded by the shielding member 34. Therefore, the electro-optical material has an arrangement in which it is shielded by the sealing unit 3 made of the sealant 31 and by the shielding member 34 between the substrates 1 and 2. However, according to the present embodiment, since the spacer members 32 are mixed in the sealant 31 but are not mixed in the shielding member 34, cases described in the "Background Art" are prevented in which wiring are degraded by breakage or short-circuiting with the conductive layer 63b at the parts of the wiring 81 and 82 where the spacer members 32 subject localized pressure to the conductive layer 62b constituting the wiring 81 and 82 which intersect with the sealing unit 3.

As shown in FIG. 3(a), planarization process may not be particularly performed on insulation layers 72, 73, and 74 laminated along with conductive layers 62b and 63b between the shielding member 34 and the substrate 1. This means that when the conductive layer 62b constituting the wiring 81 and 82 exists, uneven parts on the top surface thereof are generally subjected to localized pressure from spacer members 32 and in particular, breakage or short-circuiting tends to occur due to concentrated stresses around convex parts. According to the present embodiment, since the shielding member 34 containing no spacer members 32 exists on the wiring 81 and 82 through the insulation layer 74, neither breakage nor short-circuiting caused by the spacer members 32 occurs. In addition, since the wiring 81 and 82 are partially disposed on a part of the sealing unit 3 (only a part of one side) as in the present embodiment, it is generally difficult or impossible to perform uniform-gap-control using spacer members between the substrates 1 and 2. However, in this embodiment, an uneven surface having thus the wiring 81 and 82 is not a target for gap-control between the substrates by spacer members 32. As a result, without planarizing the unevenness caused by the wiring 81 and 82, there is no obstacle for gap-control between the substrates.

Alternatively, as shown in FIG. 3(*b*), planarization process may be performed by using CMP processing or the like on insulation layers 72, 73, and 74 laminated along with conductive layers 62*b* and 63*b* between the shielding member 34 and the substrate 1 (in the example in FIG. 3(*b*), the insulation layer 73 is planarized). When CMP processing is performed, dummy patterns for CMP may be formed from conductive layers 62*b* and 63*b* underlaid on insulation layers which are chemically polished objects for CMP processing, particularly to, perform preferable CMP processing. Here, the dummy patterns for CMP which are made of the same layer as the conductive layer 62*b* is obtained by performing patterning so as to cover substantially the entire substrate 1 except the wiring 81 and 82 made by the conductive layer 62*b*. The conductive layer 62*b* is made using Al, and the thickness thereof is approximately 500 nm (nanometers). On the other hand, the dummy patterns for CMP which are made of the same film as the conductive layer 63*b* is used as dummy patterns as well as a light-shielding layer for covering the entire substrate 1 in the region having no pixel electrodes 63*a*. The conductive layer 63*b* is made of Al and the thickness thereof is approximately 400 nm. Thus, when the dummy patterns for CMP are formed, since lines of the wiring 81 and 82 do not lead through except at the opening 33, in the same layer as conductive layers 62*b* and 63*b* underlaid on the sealant 31 having the spacer members 32 mixed therein, only the dummy patterns for CMP exist. As this result, flatness is improved, and the gap between substrates 1 and 2 is uniform on the entirety of the substrate, which enables a preferable display screen to be obtained.

In addition, each of insulation layers 72, 73, and 74, made of silicon oxide and the like, is formed at a thickness of approximately 130 nm to 1100 nm. It is preferable to perform planarization process by using CMP processing on at least the insulation layer 74 thereof, to increase the reflectance of the pixel electrode 63*a* in the image display region. In practice, without planarizing the insulation layer 73 on the side of the substrate 1, by planarizing the insulation layer 74, it is possible to finally achieve substantial flatness of the plane underlaid on the pixel electrode 63*a*. In particular, as described above, once CMP dummy patterns are formed from the same layer as conductive layer 62*b* and 63*b*, a high level of flatness can be obtained by CMP processing.

Moreover, in the present embodiment, as shown in FIG. 4, three conductive layers 61*b*, 62*b*, and 63*b* may be provided on the substrate 1. In this case, two lower conductive layers 61*b* and 62*b* constitute the wiring 81 and 82 as shown in FIG. 1. On the other hand, the upper conductive layer 63*b* constitutes a light-shielding layer defining the frames of the image display region 11 along the sealing unit 3. Furthermore, the wiring for the MOS transistors, the internal wiring of the scanning line driving circuit 12, of the data line driving circuit 13, and of the control circuit 14, the wiring for interconnecting among these, power wiring for supplying power to these driving circuits, and the dummy patterns for CMP or the like, are formed on the same layer as the conductive layer 63*b*. The described above pixel electrodes 63*a* and the dummy patterns for CMP are formed from the same layer as the conductive layer 63*b*. The other components are equivalent to the corresponding components shown in FIG. 2, and in FIG. 4, have the same reference numerals as the corresponding components shown in FIG. 2.

In FIG. 4, the conductive layer 61*b* is made of Al and the like in the same manner as conductive layers 62*b* and 63*b*, and the thickness thereof is approximately 500 nm. Also, each of insulation layers 71 to 74 is composed of silicon oxide and the like, and the thickness is approximately 130 nm to 1100 nm. Any of the layers may be planarized by CMP processing. Furthermore, when CMP processing is thus performed, the dummy patterns for CMP are preferably formed from conductive layers 61*b*, 62*b*, and 63*b*.

As shown in FIG. 4, in the manufacturing process in a case where three layers of conductive layers 61*b*, 62*b*, and 63*b* are included, when both substrates are bonded with the sealant 31 coated on the circumference thereof along with compression of both substrates, subsequently electro-optical materials composed of a liquid crystal and the like are injected through the opening 33, and then the opening 33 is shielded by the shielding member 34. Furthermore since the sealant 34 does not have the spacer members 32 mixed therein, breakage in the wiring 81 and 82, short-circuiting with one another, or short-circuiting with the conductive layer 63*b* due to localized pressure by the spacer members 32 on conductive layers 61*b* and 62*b* constituting the wiring 81 and 82 can be prevented.

As shown in FIGS. 1 to 4, in the electro-optical apparatus according to the first embodiment, particularly the scanning line driving circuit 12 and the data line driving circuit 13 are disposed inside the sealed region on the substrate 1. Therefore, compared to a case in which such driving circuits are disposed outside the sealed region of the substrate 1, the total number of the wiring 81 and 82 intersecting the sealing unit 3 may be reduced. Specifically, for example, the number of wiring intersecting the sealing unit 3 consist of approximately three to four power lines for driving the circuits, approximately four clock lines for driving the circuits, approximately two to four latch pulse lines for driving the circuits, and approximately one to twenty-four picture signal lines, the total number of these being generally far fewer than the total number (for example, from several tens to several thousands) of the scanning lines 51 and the data lines 41 and the like which led from the driving circuits to each pixel. Accordingly, it is generally easier to have wiring pass through the limited width of the opening 33 and is thus advantageous. However, even when the scanning line driving circuit 12 and/or the data line driving circuit 13 is disposed outside the sealed region, as long as the wiring led from these driving circuits to both the scanning lines 51 and the data lines 41 are led through a part of the sealing unit 3 which does not contain spacer members 32, the advantages of the present 14 invention can be obtained in which defects of wiring caused by the spacer members 32 is prevented.

Furthermore, in the first embodiment, particularly the data line driving circuit 13 is disposed nearer the part in which the wiring 81 and 82 intersect with the sealing unit 3 than is the scanning line driving circuit 12. Hence, wiring capacitance and delay of the wiring 81 and 82 increase in accordance with the length of the wiring led on the substrate 1. However, by relatively extending the length of the wiring 81 for the scanning line driving circuit 12 driven at a low frequency while relatively shortening the line length of the wiring 82 for the data line driving circuit 13 driven at a high frequency, adverse effects caused by such wiring capacitance and delay are barely or not substantially produced, and this is advantageous. In addition, when the wiring are made of the conductive layer 62b and the like composed of Al and the like, it is barely a problem that the resistance of the wiring can be basically suppressed even though wiring are fine-formed.

Next, an example of the circuit construction of the electro-optical apparatus according to the present embodiment is described along with the operations thereof with reference to FIGS. 5 and 6. In addition, as shown in FIG. 4, in the example of this construction, the three conductive layers are laminated on the substrate 1 through the four insulation layers.

In FIG. 5, the plurality of pixels arranged in a matrix constituting the electro-optical apparatus of this embodiment, and a plurality of FETs 30 are formed in a matrix to control the pixel electrodes 63a while each of the data lines 41 for supplying a picture signal is electrically connected to the source of the FET 30. Picture signals S1, S2, ..., Sn written to the data lines 41 may be supplied sequentially, in that order, or may be supplied to adjacent data lines 41 in units of groups. Also, the scanning lines 51 are electrically connected to the gates of the FETs 30, which are constructed so that scanning signals G1, G2, ..., Gm are applied in pulses to the scanning lines 51 sequentially, in that order, at predetermined timing. The pixel electrodes 63a are electrically connected to the drains of the FETs 30. By closing the switches of the FETs 30, which are switching elements, in the constant period, picture signals S1, S2, ..., Sn supplied from the data lines 41 are written to the pixel electrodes 63a. Picture signals S1, S2, ..., Sn at predetermined levels written to liquid crystals through the pixel electrodes 63a are held in the constant for a certain period between pixel electrodes and opposite-electrodes formed on the opposite substrate. Since molecular orientation changes in accordance with applied voltage levels in liquid crystals, gray shades display can be obtained by light modulation. It is impossible for incident light to pass through these liquid crystal parts in normally-white-mode in accordance with the applied voltage while it is possible for incident light to pass through these liquid crystal parts in normally-black-mode in accordance with the applied voltage. Overall, light having contrast in accordance with a picture signal is reflected by the electro-optical apparatus. Here, to prevent leakage of picture signals being held, a storage capacitor 70 is added in parallel to a liquid crystal capacitance formed between the pixel electrode 63a and the opposite-electrode (the opposite-electrode 22 shown in FIG. 2). Specifically, the storage capacitor 70 is obtained by disposing a first storage capacitor electrode extended from the drain electrode of the FET 30 and a second storage capacitor electrode composed of a part of the capacitance lines 52 (or a part of the scanning lines 51 of a precedent unit) so as to face each other through the insulation layer. With this construction, for example, the voltage of the pixel electrode 63a holds longer by three orders of magnitude in the storage capacitor 70 than the time period in which the source voltage is applied. Hence, data holding characteristics are further improved, thereby realizing an electro-optical apparatus with high contrast ratio.

In FIG. 6, beneath each pixel electrode 63a composed of Al, a second conductive layer 62a composed of the same Al light-shielding layer is formed. Although the second conductive layer 62a is made of the same layer as that of the conductive layer 62b which constitutes the wiring 81 and 82 described above, it has a function of light-shielding the gap between the adjoining pixel electrodes 63a in the image display region.

In FIG. 6, in a p-type (or a n-type) semiconductor substrate 1 as an example of one substrate, the FETs 30 are formed on an n-type (or a p-type) well region 2, and each FET 30 is separated from the other by a field oxide film 4 for the element separation. Using a semiconductor substrate made of single crystal silicon, generally called a "wafer", as the semiconductor substrate 1, the FETs 30 can be thus formed directly on the substrate 1. As such a substrate, a silicon substrate, a quartz substrate, a glass substrate or the like, which is possible to form the FET 30 or a TFT by forming the semiconductor layer thereon, may be used. In particular, as in this embodiment, in the case of a reflective type liquid crystal apparatus where a pixel electrode 63a is composed of a reflective layer, since it is not necessary for light to pass through the substrate 1, an opaque semiconductor substrate can be used. When a small liquid crystal apparatus is constructed, an element such as the FET 30 is easy to produce, which is advantageous. Also, the well region 2 is formed by impurity diffusion and the field oxide film 4 is formed by selective thermal oxidation.

In each FET 30, a source region 6a and a drain region 6b are formed by concentrating high-level-doping on the well region 2 through the opening of the field oxide film 4, and a gate electrode 5 is formed so as to face, through a gate insulation layer 5a, a channel region provided between these regions. A first insulation layer 71 is formed on the gate electrode 5 and the field oxide layer 4. The first conductive layer 61a is formed on the insulation layer 71, and the source electrode and the drain electrode of the FET 30 are constructed by connecting the first conductive layer 61 a to the source region 6a and the drain region 6b, respectively, through contact holes CH 1 and CH 2 bored in the first insulation layer 71. For example, conductive polysilicon with high-level doped or conductive metal-silicide is used as the gate electrode 5, which is formed by a CVD method or the like. For example, high-insulating glass such as NSG (non doped silicate glass), PSG (phosphorus silicate glass), BSG (boron silicate glass), and BPSG (boron phosphorus silicate glass), silicon oxide layer, silicon nitride layer or the like is used as the first insulation layer 71, which is formed by a sputtering method, a plasma CVD method employing TEOS (tetraethyl orthosilicate) or the like. In addition, Al is used as the first conductive layer 61a, which is formed by a sputtering method into a thin layer with the thickness of, for example, approximately 500 nm.

Furthermore, the second insulation layer 72 is formed on such a constructed FET 30. A second conductive layer 62a is formed on the second insulation layer 72, and is connected to the drain electrode through a contact hole CH 3 bored in the second insulation layer 72. Also, as described above, the second conductive layer 62a functions as a light-shielding layer for light-shielding the light from the gap between adjoining pixel electrodes 63a. The third insulation layer 73 is formed on the second conductive layer 62a. In the same way as the first insulation layer 71, the second insulation layer 72 and the third insulation layer 73 are composed of highly insulating glass such as NSG, PSG, BSG, or BPSG, silicon oxide layer, silicon nitride layer or the like. Regarding the film thickness, for example, the second insulation layer 72 has a film thickness of approximately 1000 nm, and the third insulation layer 73 has a film thickness of approximately 1000 nm. Furthermore, the second conductive layer 62a is composed of Al in the same way as the first conductive layer 61a, and has a film thickness of, for example, 500 nm to 800 nm. The third insulation layer 73 is formed, and furthermore, the pixel electrodes 63a are formed on the surface thereof. Here, columnar connecting plugs composed of refractory metal such as tungsten are filled in contact hole CH 4 bored in the third insulation layer 73, thereby connecting the pixel electrodes 63a to the second conductive layer 62a. In the same way as the first conductive layer 61a and the second conductive layer 62a, the pixel electrodes 63a are composed of Al and have a film thickness of, for example, approximately 400 nm individually.

In addition, instead of the FET 30 shown in FIG. 6, using a semiconductor film such as a polysilicon film, an amorphous silicon film, or a single crystal silicon film, TFTs are constructed on a substrate (a transparent substrate such as a quartz substrate or a glass substrate). In this case, in parallel with a process for forming TFT, circuit devices constituting driving circuits or the like can be formed using TFTs, which is advantageous in practice.

In addition, it is preferable that the light-shielding layer, which is thus formed from conductive layers and which is disposed inside the sealed region (that is, facing the liquid crystal), has the same electric potential as the opposite-electrode 22.

2. Second Embodiment

Figure 7:
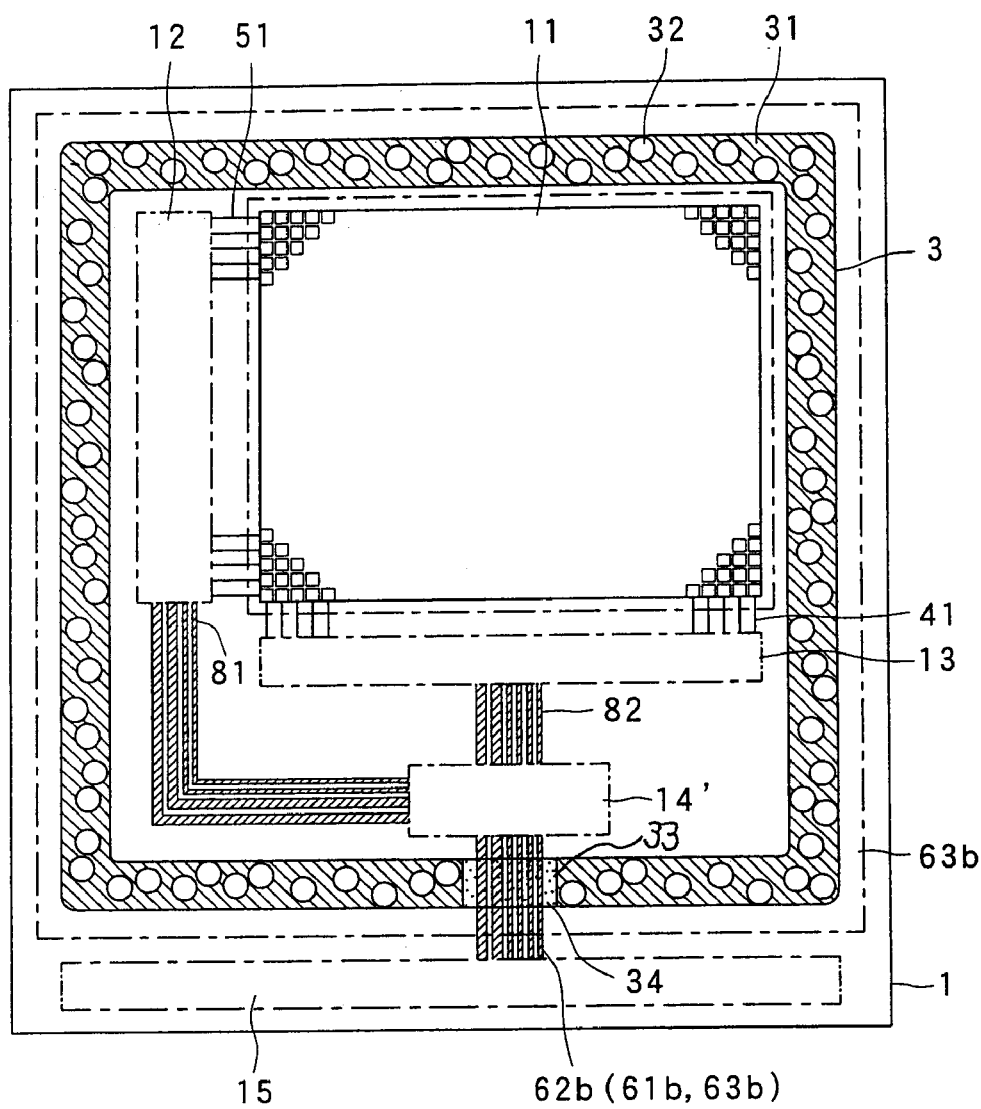
FIG. 7 is a plan view illustrating a construction of this electro-optical apparatus according to a second embodiment of the present invention.

Next, an electro-optical apparatus according to a second embodiment of the present invention is described with reference to FIG. 7. FIG. 7 is a plan view illustrating a construction of this electro-optical apparatus. Each component in FIG. 7, which is the same as the component in FIG. 1 has the same reference numeral, and explanation thereof is omitted.

In the second embodiment, a control circuit 14' is disposed, not outside the sealed region, but inside the sealed region, along with each driving circuit. The wiring from the electrode terminal for connection 15 to the control circuit 14 are formed from the conductive layer 62b or the like and are led through the opening 33 (the region facing the shielding member 34). The construction of the other components is the same as in the first embodiment.

Therefore, when the number of wiring connected to the control circuit 14' is small, even though the opening 33 is narrow, it is possible for the wiring to be led through the opening 33 to the control circuit 14' without fear of breakage or short-circuiting caused by spacer members 32.

In addition, unlike the first embodiment and the second embodiment, it is possible to adopt a construction in which the control circuit is provided as an external circuit apart from the substrate 1, a control signals are input through the electrode terminal for connection 15 from the externally-connected control circuit, and the wiring to the scanning line driving circuit 12 and the data line driving circuit 13 are led from the electrode terminal for connection 15 to the opening 33.

3. Third Embodiment

Figure 8:
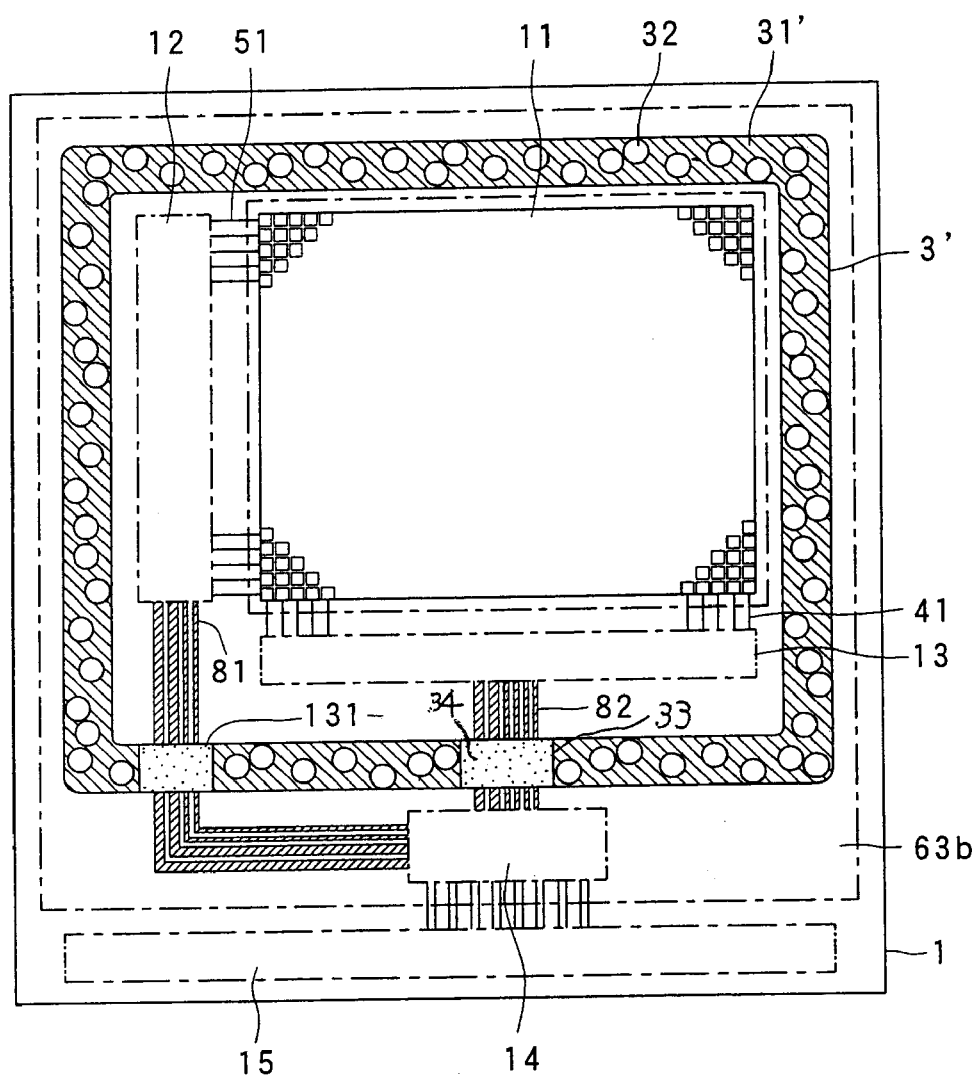
FIG. 8 is a plan view illustrating a construction of this electro-optical apparatus according to a third embodiment of the present invention.

Next, an electro-optical apparatus in accordance with a third embodiment of the present invention is described. FIG. 8 is a plan view illustrating a construction of this electro-optical apparatus. Each component in FIG. 8, which is the same as the component in FIG. 1 has the same reference numeral, and explanation thereof is omitted.

In the third embodiment, a sealing unit 3' is constructed in which a section which has spacer members 32 mixed in a sealant 31', and a section 131 which is provided other than the opening 33 for injecting the electro-optical material and which does not have spacer members 32 mixed therein, are included. The other components are the same as in the first embodiment.

In the present embodiment, since lines 81 and 82 composed of the conductive layer 62b and the like are led through between the wiring 131 not having the spacer members 32 mixed therein, these are not subjected to localized pressure caused by spacer members 32. Accordingly, degradation of wiring due to short-circuiting or breakage caused by spacer members 32 can be prevented.

In the substrate 1 of the electro-optical apparatuses in the embodiments as described above with reference to FIGS. 1 to 8, furthermore, a sampling circuit for sampling a picture signal at a predetermined timing, or a pre-charge circuit for writing a pre-charge signal with a predetermined electric potential to each data line at timing preceding the picture signal to reduce the load of writing the picture signal to data lines, may be formed, or a checking circuit or the like may be formed for checking the quality, defects, and the like of the electro-optical apparatus in a delivery inspection or an in-process inspection. In addition, as disclosed in Japanese Unexamined Patent Publication No. 9-127497, Japanese Examined Patent Publication No. 3-52611, Japanese Unexamined Patent Publication No. 3-125123, Japanese Unexamined Patent Publication No. 8-171101, and the like, a light-shielding layer made of, for example, refractory metal, may also be provided at a location where the FET 30 or TFT faces thereto on the substrate 1 (that is, beneath the FET 30 or the like). Thus, when the light-shielding layer is provided beneath the FET 30 or the like, particularly in a case where the pixel electrode 63a is a transmission type electro-optical apparatus constructed from a transparent electrode such as ITO (Indium Tin Oxide) film or the like, reflected light or the like from the substrate 1 side can be prevented from shining on the FET 30 or the like beforehand.

In each embodiment as described above with reference to FIGS. 1 to 8, a polarizer, an optical retardation film, and the like are disposed in predetermined orientations outside the opposite substrate 2 in accordance with, for example, an operation mode such as a TN (Twisted Nematic) mode, a VA (Vertically Aligned) mode, or a PDLC (Polymer Dispersed Liquid Crystal) mode, or normally-white-mode/normally-black-mode. Additionally, RGB color filters as well as protective films thereof may be formed on a predetermined region on the opposite substrate 2 facing the pixel electrode 63a. Alternatively, beneath the pixel electrode 63a facing RGB on the substrate 1, a color filter layer may be formed by a color-resist or the like. By doing this, the apparatus of each embodiment can be applied to color electro-optical apparatuses such as direct-view or reflected-view color liquid crystal televisions or the like. Moreover, microlenses may be formed on the opposite substrate 2 so that one microlens corresponds to each pixel. These formations enable a luminous electro-optical apparatus to be realized by improving condensation efficiency of the incident light. Furthermore, using interference of the light by depositing several layers of interference layers on the opposite substrate 2, whose refractive indexes are different, a dichroic filter for producing RGB colors may be formed. By the opposite substrate with this dichroic filter, an electro-optical apparatus having more luminous colors can be realized.

In addition, when a direct view electro-optical apparatus is used in each embodiment, instead of the above-described CMP processing, by leaving different levels of each insulation layer or by providing a light scattering layer having additional uneven surfaces, display can be performed by scattering reflective light caused by a reflective plate on surfaces which are on different levels or which are uneven, which enables the apparatus to function as a direct view electro-optical apparatus in a preferable manner.

4. Applications

Figure 9:
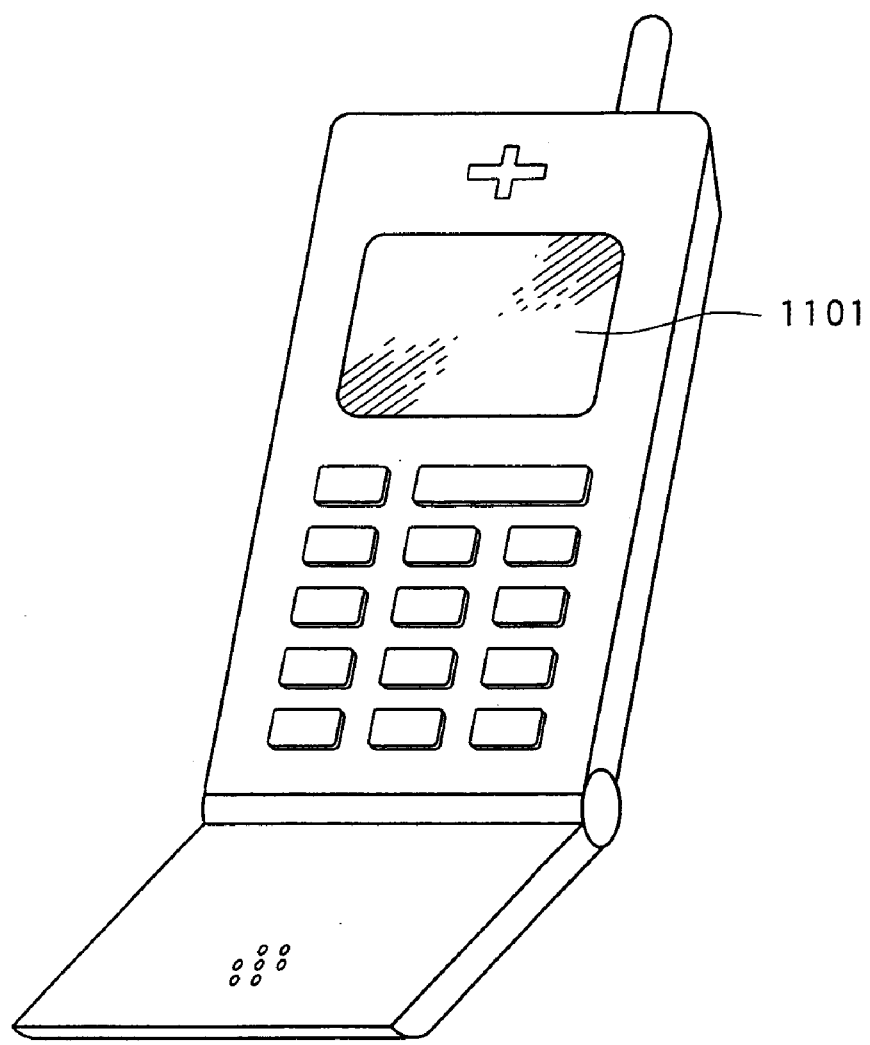
FIG. 9 illustrates a construction of a mobile phone to which electro-optical apparatuses of each embodiment are applied.
Figure 10:
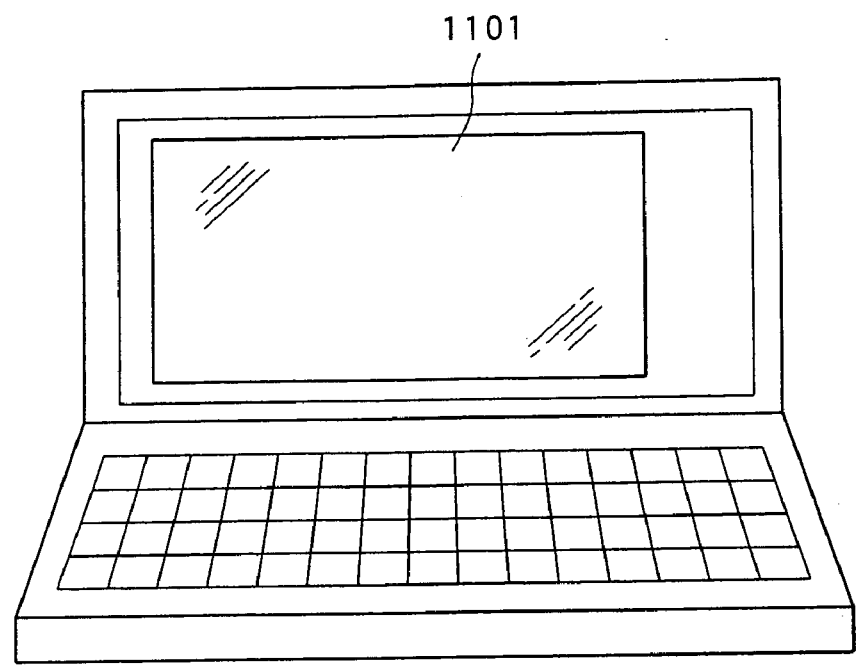
FIG. 10 illustrates a construction of a portable information terminal to which electro-optical apparatuses of each embodiment are applied.
Figure 11:
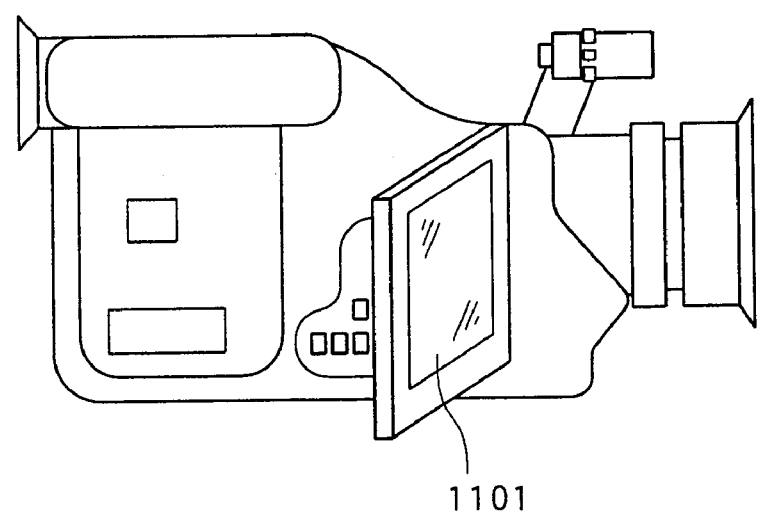
FIG. 11 illustrates a construction of a video camera to which electro-optical apparatuses of each embodiment are applied.

Next, some application examples having the described above electro-optical apparatuses incorporated therein are exemplified. FIG. 9 illustrates a mobile phone; FIG. 10 illustrates a portable information terminal; and FIG. 11 illustrates a video camera with an electro-optical material finder. Each of the electronic apparatuses has, as a display unit, the electro-optical apparatus 1101 according to the first, second, or third embodiment.

Figure 12:
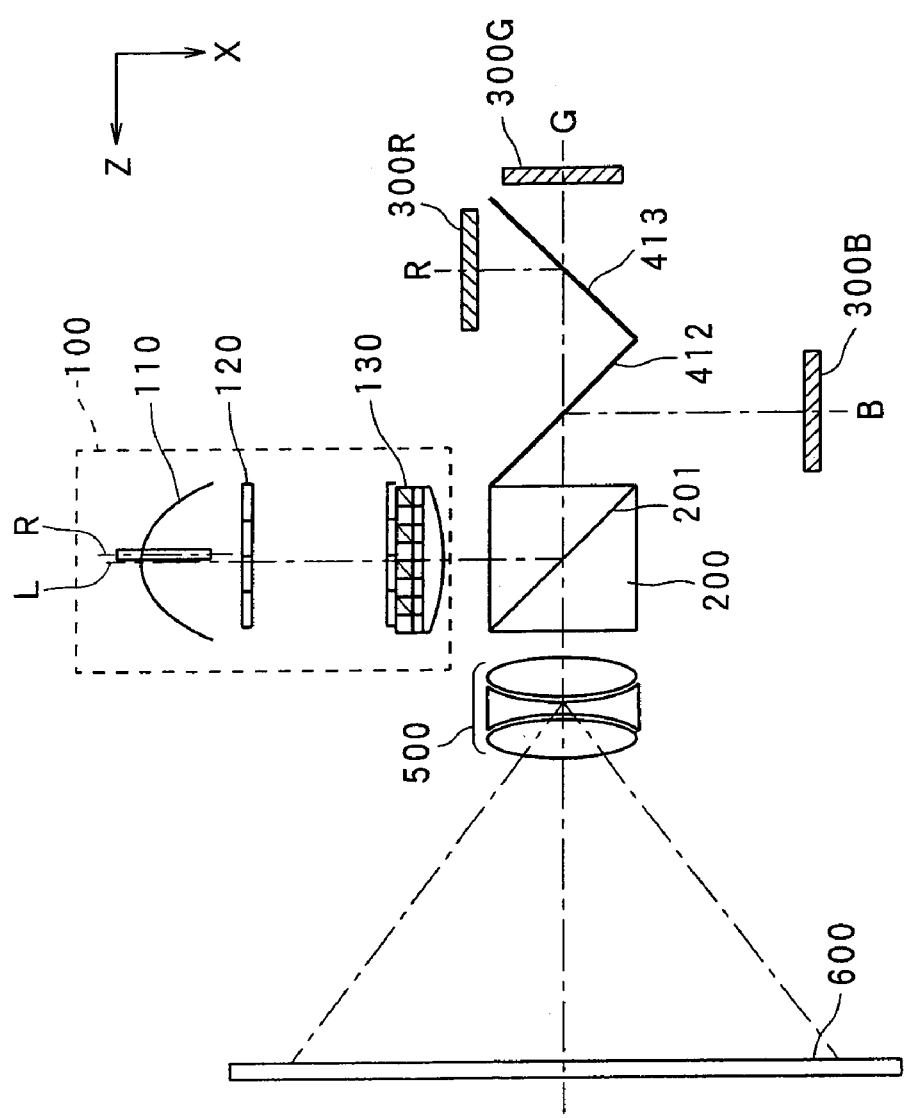
FIG. 12 illustrates a construction of a projection display device to which electro-optical apparatuses of each embodiment are applied.

Moreover, FIG. 12 illustrates an example of an electronic apparatus using an electro-optical apparatus of the present invention, and a diagrammatic plan view of a critical section of a projector (projection display device) using an electro-optical apparatus of the present invention as a reflective light valve. Thus, FIG. 12 shows a cross-sectional view taken in the XZ plane going through the center of a polarization conversion element 130. The projector of this example includes a polarized light illuminating apparatus 100, generally constructed of a light source unit 110 disposed along the system optical axis L, an integrator lens 120, and a polarization conversion element 130, a polarized light beam splitter 200 for causing an S polarizing-light-luminous-flux reflective plate 201 to reflect an S polarized light luminous flux emitted from the polarized light illuminating apparatus 100, a dichroic mirror 412 for separating the blue light (B) component out of the reflective light from the S-polarizing-light reflective plate 201 of the polarized light beam splitter 200, a reflective light valve 300B for modulating the separated blue light (B) a dichroic mirror 413 for separating the red light (R) component out of the subsequent luminous flux having the blue light separated therefrom, a B reflective light valve 300R for modulating the separated red light (R), a reflective light valve 300G for modulating the green light (G) transmitted through the dichroic mirror 413, and an optical projection system 500 including a projection lens for causing lights modulated by three reflective light valves 300R, 300G, and 300B to be combined at dichroic mirrors 412 and 413, and the polarized light beam splitter 200, and then projecting this combining light onto a screen 600. Each of the three reflective three light valves 300R, 300G, and 300B described above uses one of the first, second, or third embodiment of the electro-optical apparatuses described above.

After randomly polarized luminous flux emitted from the light source unit 110 is divided into multiple intermediate luminous fluxes by the integrator lens 120, the multiple intermediate luminous fluxes are converted into a single type of polarized light luminous flux (S polarized light luminous flux), having the polarized direction generally arranged by the polarization conversion element 130 with a second integrator lens provided on the incident light side and are transmitted into the polarized light beam splitter 200. The S polarized light luminous flux emitted from the polarization conversion element 130 is reflected by the S polarizing-light-luminous-flux reflective plate 201 of the polarized light beam splitter 200, and blue light (B) luminous flux among the reflected luminous fluxes is reflected at the blue light reflective layer of the dichroic mirror 412 and is modulated by the reflective light valve 300B. Moreover, red light (R) luminous flux among the luminous fluxes which are transmitted through the blue light reflective layer of the dichroic mirror 412 is reflected at the red light reflective layer of the dichroic mirror 413, and is modulated by the reflective light valve 300R. On the other hand, green light (G) luminous flux, transmitted through the red light reflective layer of the dichroic mirror 413, is modulated by the reflective light valve 300G. Thus, color light beams are individually modulated by reflective light valves 300R, 300G, and 300B.

When an electro-optical apparatus, constituting reflective light valves 300R, 300G, 300B, is a liquid crystal apparatus, a TN type liquid crystal (the long axes of the liquid crystal molecules are generally oriented parallel to the panel substrate when no voltage is applied), or an SH type liquid crystal (the long axes of the liquid crystal molecules are generally oriented perpendicular to the substrate when no voltage is applied), is adopted.

When the TN type liquid crystal is adopted, in a pixel (OFF pixel) in which the applied voltage at the liquid crystal layer held between the reflective electrode of the pixel and the common electrode of the opposite substrate is equal to or less than the threshold voltage of the liquid crystal, an incident color light beam is elliptic polarized by the liquid crystal layer, is reflected by the reflective electrode, and is reflected to be emitted, through the liquid crystal layer, as light in a generally elliptic polarization condition in which many polarized light axis components, approximately ninety degrees out of phase with the polarized axis of the incident color light beam, are contained. On the other hand, in a pixel (ON pixel) in which the voltage is applied at the liquid crystal layer, the unmodified incident color light beam is transmitted to the reflective electrode, is reflected, and is reflected to be emitted with the same polarized light axis as that when the color light beam enters. Since the alignment angle of the liquid crystal molecules of TN type liquid crystal varies in accordance with the applied voltage at the reflective electrode, the angle of the polarized light axis of the reflective light to the incident light varies in accordance with the applied voltage at the reflective electrode through the transistor of the pixel.

In addition, when the SH type liquid crystal is adopted, in a pixel (OFF pixel) in which the applied voltage at the liquid crystal layer is equal to or less than the threshold voltage of the liquid crystal, an unmodified incident color light beam is transmitted to the reflective electrode, is reflected, and is reflected to be emitted with the same polarized light axis as that when the color light beam enters. Whereas, in a pixel (ON pixel) with the applied voltage at the liquid crystal layer, the incident color light beam is elliptic-polarized by the liquid crystal layer, is reflected by the reflective electrode, and is reflected to be emitted, through the liquid crystal layer, as the elliptic polarized light in which many polarized light axis components, approximately ninety degrees out of phase with the polarized axis of the incident light, are contained. In the same manner as for the TN type liquid crystal, since the arrangement angle of the liquid crystal molecules of the TN type liquid crystal varies in accordance with the applied voltage at the reflective electrode, the angle of the polarized light axis of the reflective light to the incident light is varied in accordance with the applied voltage at the reflective electrode through the transistor of the pixel.

Among the color light beams reflected from the pixels of these electro-optical apparatuses, S polarized light components are not transmitted through the polarized light beam splitter 200 which reflects S polarized light, whereas P polarized light components are transmitted therethrough. An image is formed by the light which is transmitted through this polarized light beam splitter 200. Therefore, when the electro-optical apparatus adopts the TN type liquid crystal, since the reflective light of an OFF pixel enters the projection optical system 500 while the reflective light of an ON pixel does not enter the lens, the projected image is displayed as normally-white. When the electro-optical apparatus adopts the SH type liquid crystal, since the reflective light of an OFF pixel does not enter the projection optical system 500 while the reflective light of an ON pixel enters the projection optical system 500, the projected image is displayed as normally-black.

Compared to an active matrix electro-optical apparatus obtained by forming TFT arrays on a glass substrate, in an reflective electro-optical apparatus, since the pixels are formed by taking advantage of semiconductor technology, pixels can be formed in greater numbers and the size of the panel can be reduced, which enables a high-definition image to be projected and enables the projector to be miniaturized.

Other than the electronic apparatuses shown in FIGS. 9 to 12 as described above, the electro-optical apparatuses according to the first to the third embodiments can be applied to electronic apparatuses, such as liquid crystal televisions, view-finder type or monitor direct-view type videotape recorders, car navigation systems, personal digital assistants, desk calculators, word processors, engineering workstations (EWS), videophones, POS terminals, and apparatuses having a touch panel.

In addition, the present invention is not limited to the embodiments described above. Modifications of the embodiments can be carried out within the scope of the present invention.

What is claimed is:

1. An electro-optical apparatus, comprising:
   an electro-optical material provided in a region surrounded by a sealing unit between a pair of substrates;
   a conductive layer laminated on one of the pair of substrates, the sealing unit including a part having a spacer member and a part not having the spacer member, and a part of the sealing unit not having the spacer member being provided in a region in which wiring, made of the conductive layer on the one of the substrates, faces the sealing unit, wherein the wiring comprises a plurality of conductive lines in the region defined by the part of the sealing unit not having the spacer member.

2. The electro-optical apparatus as set forth in claim 1, the conductive layer including a plurality of conductive layers laminated on the substrate through an interlayer insulating film.

3. The electro-optical apparatus as set forth in claim 2, the part of the sealing unit not having the spacer member being a shielding unit for shielding an opening through which the electro-optical material is injected.

4. The electro-optical apparatus as set forth in claim 2, at least a part of the conductive layer being a light-shielding film.

5. The electro-optical apparatus as set forth in claim 2, further comprising an interlayer insulating film formed on the wiring and planarized.

6. The electro-optical apparatus as set forth in claim 2, further comprising a plurality of pixel electrodes arranged in an internal sealed region located inside the sealant, viewed from a level of the substrate, and a driving circuit connected to the wiring and which drives the pixel electrodes.

7. The electro-optical apparatus as set forth in claim 1, the part of the sealing unit not having the spacer member being a shielding unit for shielding an opening through which the electro-optical material is injected.

8. The electro-optical apparatus as set forth in claim 7, at least a part of the conductive layer being a light-shielding film.

9. The electro-optical apparatus as set forth in claim 7, further comprising an interlayer insulating film formed on the wiring and planarized.

10. The electro-optical apparatus as set forth in claim 7, further comprising a plurality of pixel electrodes arranged in an internal sealed region located inside the sealant, viewed from a level of the substrate, and a driving circuit connected to the wiring and which drives the pixel electrodes.

11. The electro-optical apparatus as set forth in claim 1, at least a part of the conductive layer being a light-shielding film.

12. The electro-optical apparatus as set forth in claim 11, further comprising an interlayer insulating film formed on the wiring and planarized.

13. The electro-optical apparatus as set forth in claim 11, further comprising a plurality of pixel electrodes arranged in an internal sealed region located inside the sealant, viewed from a level of the substrate, and a driving circuit connected to the wiring and which drives the pixel electrodes.

14. The electro-optical apparatus as set forth in claim 1, further comprising an interlayer insulating film formed on the wiring and planarized.

15. The electro-optical apparatus as set forth in claim 14, further comprising a plurality of pixel electrodes arranged in an internal sealed region located inside the sealant, viewed from a level of the substrate, and a driving circuit connected to the wiring and which drives the pixel electrodes.

16. The electro-optical apparatus as set forth in claim 1, further comprising a plurality of pixel electrodes arranged in an internal sealed region located inside the sealant, viewed from a level of the substrate, and a driving circuit connected to the wiring and which drives the pixel electrodes.

17. The electro-optical apparatus as set forth in claim 16, further comprising a plurality of scanning lines and a plurality of data lines, which are connected to the pixel electrodes, and which are provided in the internal sealed region, the driving circuit including a scanning line driving circuit and a data line driving circuit for driving the scanning lines and the data lines, respectively, and the data line driving circuit being provided nearer a part where the wiring intersects the sealing unit than where the scanning line driving circuit is located.

18. The electro-optical apparatus as set forth in claim 16, comprising a control circuit provided in the internal sealed region for controlling the driving circuits.

19. An electronic apparatus, comprising:
   a display unit; and
   the electro-optical apparatus of claim 1.

20. The electronic apparatus as set forth in claim 19, the conductive layer including a plurality of conductive layers laminated through an interlayer insulating film on the substrate.

21. A projection display device, comprising:
   a light source that emits light;
   the electro-optical apparatus of claim 1, the electro-optical apparatus modulating the light emitted by the light source, the modulated light being projected onto a screen.

22. The projection display device as set forth in claim 21, conductive layer including a plurality of conductive layers laminated through an interlayer insulating film on the substrate.

23. The electro-optical apparatus as set forth in claim 1, the part of the sealing unit having a spacer member being greater than the part of the sealing unit not having the spacer member.

24. A method for manufacturing an electro-optical apparatus including one substrate having a conductive layer laminated thereon, and the other substrate, being bonded with a sealing unit including a part having a spacer member and a part not having a spacer member, the method comprising:

forming the sealing unit provided so that a part of the sealing unit not having the spacer member is provided in a region on the substrate in which wiring, made of the conductive layer, faces the sealing unit, wherein the wiring comprises a plurality of conductive lines in the region defined by the part of the sealing unit not having the spacer member.

25. The method for manufacturing an electro-optical apparatus as set forth in claim 24, the sealing unit forming step including a step of coating the sealant so that an opening for injection of the electro-optical material is provided in the region in which wiring, made of the conductive layer, faces the sealing unit.

26. The method for manufacturing an electro-optical apparatus as set forth in claim 25, the method further comprising:

forming the wiring from a plurality of the conductive layers laminated on the substrate through an interlayer insulating film before the sealing unit forming step.

27. The method for manufacturing an electro-optical apparatus as set forth in claim 24, the method further comprising:

forming the wiring from a plurality of the conductive layers laminated on the substrate through an interlayer insulating film before the sealing unit forming step.

28. The method for manufacturing an electro-optical apparatus as set forth in claim 24, the part of the sealing unit having a spacer member being greater than the part of the sealing unit not having the spacer member.

* * * * *